United States Patent [19]
Grinsteiner

[11] Patent Number: 5,310,227
[45] Date of Patent: May 10, 1994

[54] HIGH PRESSURE FLEX FITTING

[75] Inventor: James J. Grinsteiner, Union, Ill.

[73] Assignee: Navistar International Transportation Corp., Chicago, Ill.

[21] Appl. No.: 870,990

[22] Filed: Apr. 20, 1992

[51] Int. Cl.$^5$ .............................................. F16L 19/00
[52] U.S. Cl. ................................. 285/354; 285/348; 285/234; 285/334.5
[58] Field of Search ............ 285/234, 348, 379, 334.5, 285/354

[56] References Cited

U.S. PATENT DOCUMENTS

| | | | |
|---|---|---|---|
| 2,053,626 | 9/1936 | Parker | 285/234 |
| 2,090,266 | 8/1937 | Parker | 285/234 |
| 2,300,584 | 11/1942 | Martin | 285/234 |
| 2,354,538 | 7/1944 | Parker | 285/234 |
| 2,425,662 | 8/1947 | Wolfram | 285/234 |
| 2,452,889 | 11/1948 | Wolfram | 285/234 |
| 2,459,609 | 1/1949 | Wolfram | 285/348 |
| 2,463,336 | 3/1949 | Weatherhead | 285/234 |
| 2,724,602 | 11/1955 | Carey et al. | 285/234 |
| 2,950,928 | 8/1960 | Bowan | 285/348 |
| 2,999,701 | 9/1961 | Blair et al. | 285/348 |
| 3,185,501 | 5/1965 | Bowan | 285/348 |
| 3,414,299 | 12/1968 | Roe | 285/234 |
| 3,684,322 | 8/1972 | Kotsakis | 285/348 |
| 3,986,730 | 10/1976 | Martelli | 285/348 |
| 4,538,842 | 9/1985 | Kowal et al. | 285/234 |

FOREIGN PATENT DOCUMENTS

| | | | |
|---|---|---|---|
| 515002 | 11/1939 | United Kingdom | 285/234 |
| 878602 | 10/1961 | United Kingdom | 285/234 |

OTHER PUBLICATIONS

"Imperial Eastman Fluid Transmission Components" Catalog No. 114-C, Imperial Clevite, Inc., pp. 46–47, 72–73, 80, 83, published prior to 1991.

*Primary Examiner*—Eric K. Nicholson
*Attorney, Agent, or Firm*—Dennis K. Sullivan

[57] ABSTRACT

A high pressure flex fitting comprises a tube assembly which engages within a fitting body. The tube assembly comprises a tube upon which a deformable flanged compression sleeve is disposed adjacent an elastomeric sealing ring which in turn is adjacent a retainer ring, the retainer ring being seated adjacent a flared end of the tube. A nut having an end flange engages over the sleeve and the flange on the nut bears against the radial flange on the sleeve, pushing the sleeve on the tube into the fitting body when the nut is threadedly engaged onto the fitting body. The fitting body includes a large cavity, within which the flared end of the tube is suspended, have a tapered inner entrance section from an entrance diameter larger than the sleeve to an inner diameter smaller than the sleeve to completely fill the area between the cavity wall and the tube adjacent the sealing ring which effects the seal between the cavity wall and the tube to prevent extrusion and fracturing thereof.

19 Claims, 1 Drawing Sheet

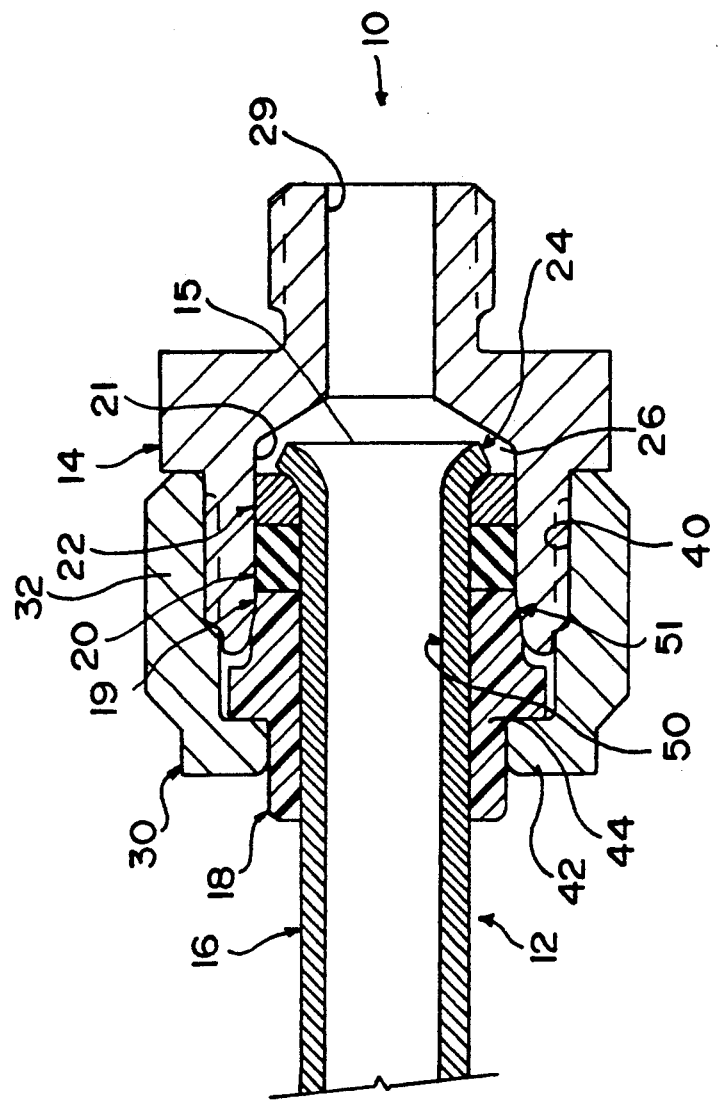

HIGH PRESSURE FLEX FITTING

BACKGROUND OF THE INVENTION

The present invention relates to a hydraulic flex fitting designed for use in a high pressure environment where it may be subjected to a high level of vibration and where tube and fitting body misalignment may be a problem.

THE PRIOR ART

Heretofore, various types of fittings have been used in the types of environment described above.

For example, flared compression fittings are used in high pressure environments but are subject to severe stress at the area incorporating the flare provided at the end of the tubing entrapped within the fitting body. Misalignment increases the stress in certain areas and when vibration is added, fatigue failure of the tube may result.

Flex fittings have been used in such an environment. These fittings incorporate a short sealing sleeve disposed about the tube, the sleeve permitting the tube to flex slightly. These fittings inherently fail under high pressure conditions because the sleeve seal provided therein is not well supported and cannot function under high pressure.

SUMMARY OF THE INVENTION

Accordingly, it is an object of the invention described and claimed herein to provide a flex fitting for high pressure applications which accommodates vibration without tube failure and which is tolerant of tube and fitting body misalignment.

A further object of the invention is to provide a high pressure flex fitting which accommodates reasonable part tolerances.

A more specific object of the invention is to provide an elastomeric seal and a compressive sleeve having zero clearance within the fitting on the low-pressure side of the elastomeric seal to provide complete support therefor.

These and other objects are met by a high pressure flex fitting which includes a tube assembly comprising a tube upon which a nut, a sleeve, an O-ring and a retainer ring are disposed in reverse sequence adjacent a flared tube end. When the tube assembly is assembled to a fitting body, the O-ring is compressed to establish a high pressure seal between the tube assembly and the fitting body. The retainer ring and the flared tube end prevent the tube from being forced out of the fitting body by high fluid pressure. Further, the interior end of the sleeve is compressed within the fitting body, creating a flexible zero clearance fit between the tube, the sleeve and the connector, thereby completely filling the fitting cavity adjacent the O-ring to prevent the O-ring from extruding around the compression sleeve. The compression sleeve further may deform asymmetrically to support the tube within the fitting and thereby allow for a level of tolerated misalignment between the tube and the fitting body.

BRIEF DESCRIPTION OF THE DRAWING

Other objects and advantages of the invention will become more apparent upon perusal of the detailed description thereof and upon inspection of the drawing which is a diametral cross-section through a high pressure flex fitting constructed in accordance with the present invention.

DESCRIPTION OF THE PREFERRED EMBODIMENT

Referring now to the drawing in greater detail, there is illustrated therein a high pressure hydraulic flex fitting assembly 10 made in accordance with the teachings of the present invention which may be used in conjunction with a hydraulically actuated unit fuel injector in an internal combustion engine to transfer the actuating fluid thereto at pressures on the order of 3000 psi.

The fitting assembly 10 includes a tube assembly 12 and a fitting body 14 having a cavity 26 within which an end 15 of the tube assembly 12 is inserted.

The tube assembly 12 includes a tube 16 over which a flanged compression sleeve 18 made of deformable plastic material is disposed in close fitting sliding engagement therewith and having an interior end 19 and an exterior end 41 separated by a diametral exterior flange 44 thereon. A nut 30 is positioned exteriorly of the compression sleeve flange 44 and the interior end 19 of sleeve 18 abuts against an elastomeric sealing ring 20, preferably an O-ring, disposed about the tube to act as the high pressure seal for the fitting 10. The O-ring 20 has an outer diameter slightly larger than the inner diameter 21 of the cavity 26 and an inner diameter about equal to the tube diameter to preferably effect a crush of the O-ring of about 16% when the tube assembly 12 is inserted in the fitting cavity 26 so that a high pressure seal will be effected. The O-ring 20 is abutted on the high pressure side thereof by a retainer ring 22 of metal or plastic material having a slightly smaller outer diameter than the inner wall 21 and a chamfered leading inner diametral edge which seats against the exterior surface of a flared end 24 of the tube 16.

The flared end 24 of the tube 16 is received within a central cylindrical cavity 26 of the fitting body 14 defined by an inner wall 21 which is of a diameter slightly smaller than the diameter of the interior end 19 of the sleeve 18, and which tapers to a larger diameter at open end of the cavity which is slightly larger than the diameter of the inner end 19 of the sleeve so as to guide the sleeve 18 into the cavity during assembly. The flared end 24 of tube 16 is suspended within the cavity 26 primarily by the compression sleeve 18. The cavity 26 is intersected by an inlet passage 29 which is approximately the same diameter as the inside diameter of the tube 16, the flared end 24 of the tube 12 facing the inlet passage 29. The tube end 24 is secured within the cavity 26 by threaded engagement of the nut 30, which is received over the tube 16 and the sleeve 18, with the fitting body 14.

In this respect, the end 32 of the fitting body 14 is externally threaded to engage a threaded internal surface 40 of the nut 30. The nut 30 has a radially inwardly extending end flange 42 thereon which engages against the flange 44 integrally formed on the compression sleeve 18, compressing the sleeve 18, the O-ring 20, and retainer 22 toward the flared end 24 of the tube 12.

It will be seen that the sleeve 18 provides a means for creating a zero clearance fit at 50 between itself, the tube 16, and the fitting body 14. The sleeve 18 is made of a plastic material and is deformable which allows creation of zero clearance fits at 50 and 51 so that the sleeve acts as a complete support on the low pressure side for the O-ring seal 20 to prevent the O-ring from extruding or being fractured and thus eliminates potential leakage of high pressure fluid past a failed seal. Further, the sleeve 18 is made of deformable plastic, and may asymmetrically deform if the axes of the tube and cavity are misaligned or skewed so that a limited amount of such misalignment within the limits of the O-ring 20 and reasonable part tolerances may be accommodated.

During assembly of the fitting assembly 10, the nut 30, the sleeve 18, the O-ring 20, and the retainer ring 22 are placed onto the tube 16 to form tube assembly 12. The end 24 of the tube 16 is then flared and the end 15 of the tube assembly 12 including the flared end 24 of the tube 16 is suspended within the cavity 26 of the fitting body 14 by interposing the sleeve 18, the O-ring 20 and the retainer ring 22 between the tube 16 and an inner wall 21 of the fitting body 14. By allowing the flared end 24 to be suspended within the cavity 26, no stress is placed thereon.

The nut 30 is then moved over the sleeve 18 with the end flange 42 thereof engaging against radial flange 44 on sleeve 18 and into proximity with the fitting body 14. As the nut 30 is threaded onto fitting body 14, the end flange 42 of the nut 30 bears against the sleeve flange 44, pushing the sleeve 18 against the O-ring 20 which enters cavity 26. The sleeve 18 is also forced into the cavity 26 of the fitting body and being of a slightly larger diameter, deforms to conform to fill the space between the cavity wall 21 and the tube 12. Upon high pressure being applied within the fitting cavity 26, the retainer ring 22 may be forced against the O-ring 20, thereby further expanding it against the interior wall 21 of the fitting to enhance the seal therebetween.

Since the flared end 24 of the tube 16 does not bear against anything other than retainer ring 22, being suspended by the deformable sleeve 18 and O-ring 20 within the center cavity 26 of the fitting body 14, there is no metal to metal contact between the flared end 24 of the tube 16 and the fitting body 14. Vibrations, which might cause failure of a conventional flared fitting, are partially absorbed by the sleeve 18 and O-ring 20 and in any event do not affect the flared end of the tube where stresses would be otherwise concentrated.

As described above, the fitting of present invention has a number of advantages, some of which have been described above and others of which are inherent in the invention. Also, modifications can be proposed to the fitting without departing from the teachings herein. For example, the flange 44 could be deleted from the deformable sleeve 18 and the nut 30 could have a smaller opening to engage either the end of sleeve 18 or a metal backup sleeve provided therebetween. Accordingly, the scope of the invention should only be limited in accordance with the structure defined in the accompanying claims and equivalents thereof.

What is claimed is:

1. A high pressure flex fitting assembly comprising:
   a fitting body including a fluid passage therethrough, said fitting body having a wall defining an internal cylindrical cavity having an inside diameter communicating with said passage and having a threaded exterior surface; and
   a tube assembly having an enlarged end disposed within said cavity and including a tube upon which a retainer ring, an elastomeric sealing member, a compression sleeve, and an internally threaded nut are disposed sequentially from said enlarged end of said tube assembly, said compression sleeve having a deformable cylindrical end portion disposed adjacent said elastomeric sealing ring, said cylindrical portion of said sleeve having an outer diameter larger than the inside diameter of said cavity wall, said threaded nut upon being engaged with said threaded fitting surface having an end flange operatively engaging said sleeve to push said sleeve into said cavity against the elastomeric sealing member to a point at which said compression sleeve is deformed and an interference fit between said sleeve and said cavity wall is obtained, and said elastomeric sealing ring having its inner and outer diameters of such dimension relative to said tube that upon insertion within said cavity, said elastomeric sealing ring becomes compressed to effect a seal between said elastomeric sealing ring and said cavity wall and between said elastomeric sealing ring and said tube.

2. The fitting of claim 1 wherein the tube end is flared.

3. The fitting assembly of claim 2 wherein said inner wall of said cavity is tapered from said inner diameter to an entrance diameter to said cavity, said entrance diameter being larger than said outer diameter of said compression sleeve.

4. The fitting assembly of claim 3 wherein said sleeve has an integral radial flange disposed thereon for engagement by said nut.

5. The fitting assembly of claim 3 wherein said sleeve end portion completely fills the area between said cavity wall and said tube at the end of said compression sleeve adjacent said elastomeric sealing ring.

6. The fitting assembly of claim 1 wherein said tube, said nut and said fitting body are made of metal.

7. The fitting assembly of claim 1 wherein said enlarged end of said tube is received within said cavity in a manner to be spaced from said cavity wall.

8. The fitting of claim 2 wherein said retainer ring abuts against the flared end of the said tube.

9. The fitting of claim 8 wherein said retainer ring has a chamfered inner circumferential edge which engages said flared tube end.

10. The fitting of claim 8 wherein said retainer ring has an outer diameter less than the inner diameter of said cavity wall.

11. A tube assembly for use in a high pressure flex fitting arrangement to be received within a fitting body having a cylindrical cavity of a predetermined diameter, said tube assembly comprising:
   a tube having a flared end, the outer diameter of said flared end being less than the inner diameter of said cavity;
   a retainer ring slidingly disposed on said tube adjacent said flared end, and having an outer diameter less than the inner diameter of said cavity;
   an elastomeric sealing ring disposed on said tube adjacent said retainer ring;
   a deformable compression sleeve of plastic material slidably disposed on said tube adjacent said elastomeric sealing ring, said sleeve having an end adjacent said elastomeric sealing ring having an outer diameter larger than said inner diameter of said cavity; and
   fastener means for pushing said compression sleeve into said cavity to a point at which said compression sleeve is deformed and completely fills the space between said tube and said cavity wall at the end of said compression sleeve adjacent said elastomeric sealing ring.

12. The tube assembly of claim 11 and said sleeve having an end adjacent said elastomeric sealing ring having an outer diameter larger than said inner diameter of said cavity.

13. The tube assembly of claim 11 and said elastomeric sealing ring having an outer diameter larger than said inner diameter of said cavity.

14. The tube assembly of claim 13 and said elastomeric sealing ring having an inner diameter equal to the diameter of said tube.

15. The tube assembly of claim 11 and the side of said retainer ring adjacent to said flared end of said tube being configured to conform thereto.

16. The tube assembly of claim 11 and said fastening means comprising a nut having threads disposed to engage said fitting body.

17. The tube assembly of claim 16 and said compression sleeve having a radially disposed flange, said nut having an inturned flange disposed to engage an integral flange disposed on said compression sleeve.

18. A high pressure flex fitting assembly comprising:
a fitting body including a fluid passage therethrough, said fitting body having a wall defining an internal cylindrical cavity having an inside diameter communicating with said passage and having a threaded exterior surface; and
a tube assembly received within said fitting body cavity, said tube assembly comprising:
a tube having a flared end, the outer diameter of said flared end being less than the inner diameter of said cavity;
a retainer ring slidingly disposed on said tube adjacent said flared end, and having an outer diameter less than the inner diameter of said cavity wall;
an elastomeric sealing ring disposed on said tube adjacent said retainer ring;
a compression sleeve slidably disposed on said tube adjacent said elastomeric sealing ring, said compression sleeve having an outer diameter larger than said inner diameter of said fitting cavity wall; and
fastener means for forcing said compression sleeve into said cavity to a point at which said compression sleeve is deformed between said tube and said cavity wall.

19. The fitting assembly of claim 18 wherein said wall of said cavity is tapered from said inner diameter to an entrance diameter to said cavity, said entrance diameter being larger than said outer diameter of said compression sleeve, said compression sleeve having a deformable end portion completely filling the area between the cavity wall and the tube at the end of said compression sleeve adjacent said elastomeric sealing ring.

* * * * *